United States Patent [19]

Osburn

[11] 4,014,675

[45] Mar. 29, 1977

[54] FERTILIZER STICK

[75] Inventor: George E. Osburn, Wilmington, Del.

[73] Assignee: Hercules Incorporated, Wilmington, Del.

[22] Filed: Dec. 5, 1974

[21] Appl. No.: 529,645

[52] U.S. Cl. .................................... 71/28; 71/29; 71/31; 71/34; 71/64 F; 71/1

[51] Int. Cl.$^2$ .......................................... C05C 9/02

[58] Field of Search ............... 71/1, 27, 28–30, 71/31, 34, 64 SC, 64 A, 64 F; 260/231 A, 231 R, 226

[56] References Cited

UNITED STATES PATENTS

| | | | |
|---|---|---|---|
| 667,467 | 2/1901 | Sherman | 71/64 SC |
| 1,948,117 | 2/1934 | Kadow | 47/48 |
| 1,971,390 | 8/1934 | Van Yahres | 47/48 |
| 1,988,307 | 1/1935 | Fay | 47/1 |
| 2,032,608 | 3/1936 | Antrim | 47/1 |
| 2,091,993 | 9/1937 | Jones | 71/64 SC |
| 2,298,232 | 10/1942 | Remund | 71/64 SC |
| 2,380,721 | 7/1945 | Brigden | 47/1 |
| 2,982,394 | 5/1961 | Novak | 206/46 |
| 3,057,713 | 10/1962 | Gessler | 71/64 |
| 3,059,379 | 10/1962 | Attoe | 47/48.5 |
| 3,060,012 | 10/1962 | Pavek | 71/64 |
| 3,192,032 | 6/1965 | Thomas | 71/28 |
| 3,192,033 | 6/1965 | McCorquodale, Jr. | 71/28 |
| 3,232,007 | 2/1966 | Boatwright | 71/64 SC |
| 3,267,857 | 10/1966 | Stansbury et al. | 71/64 |
| 3,290,821 | 12/1966 | Parry | 47/48.5 |
| 3,502,458 | 3/1970 | Schenk | 71/64 |
| 3,647,416 | 3/1972 | Messman | 71/64 A |
| 3,852,421 | 12/1974 | Koyanagi et al. | 260/231 R X |
| R27,238 | 11/1971 | Stansbury et al. | 71/27 |

Primary Examiner—Frank A. Spear, Jr.
Assistant Examiner—Ferris H. Lander
Attorney, Agent, or Firm—George H. Hopkins; Stanley A. Becker; Joshua W. Martin, III

[57] ABSTRACT

This invention relates to a fertilizer stick composed of water soluble thermoplastic material and dispersed therein about 10 to about 80% of fertilizer material. The fertilizer stick gradually dissolves when placed in a potting medium or soil to supply plant growth nutrients to the roots of a plant.

8 Claims, 4 Drawing Figures

FERTILIZER STICK

This invention relates to fertilizer sticks. In particular, this invention relates to a fertilizer stick which gradually dissolves when placed in a potting medium or soil to supply plant growth nutrients to the roots of a plant.

In summary, this invention comprises a fertilizer stick composed of water-soluble thermoplastic material and dispersed therein about 10 to about 80%, by weight, based on the weight of the total composition of fertilizer material.

Figure 1:
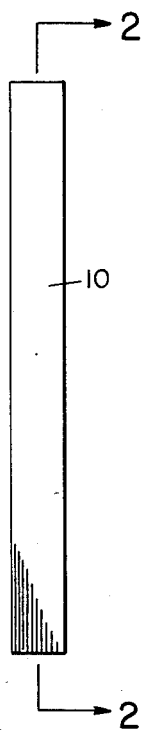
FIG. 1 shows a preferred embodiment of the fertilizer 10 stick 10 of this invention.
Figure 2:
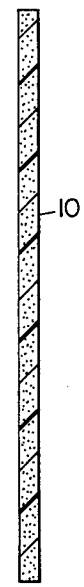
FIG. 2 shows a cross-section of the fertilizer stick 10 along the line 2—2 of FIG. 1.
Figure 3:
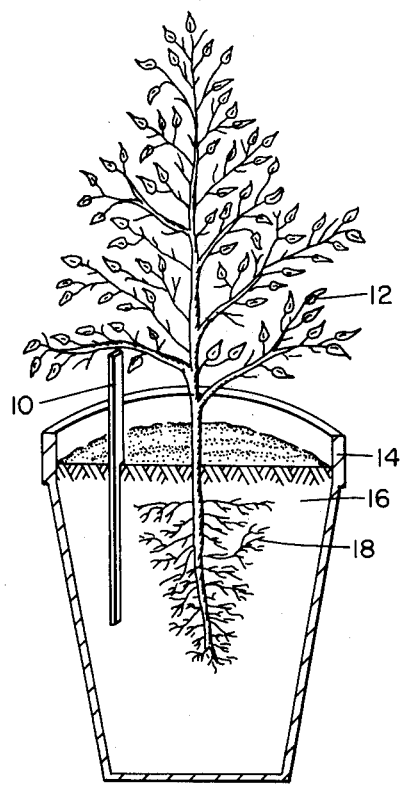
FIG. 3 shows one method of using the fertilizer stick of this invention.

More specifically FIG. 3 shows the fertilizer stick 10 in use to fertilize the plant 12 which is contained in a pot 14. The fertilizer stick 10 is partially inserted in the potting medium 16 adjacent the roots 18 of the plant.

Figure 4:
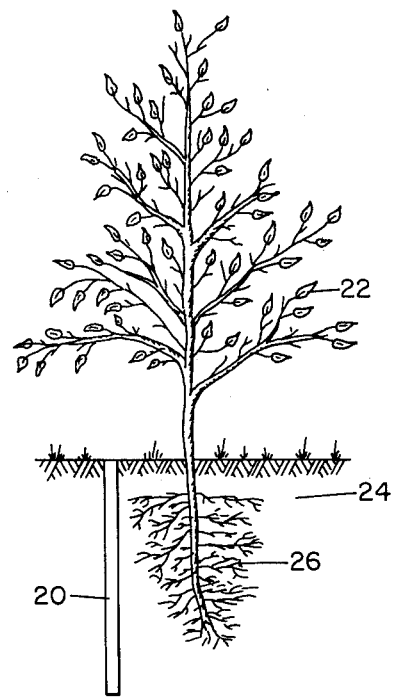
FIG. 4 shows an alternate method of using the fertilizer stick of this invention.

FIG. 4 shows the fertilizer stick 20 in use to fertilize the plant 22 growing in the ground. The fertilizer stick is completely inserted into the soil 24 adjacent the roots 26 of the plant.

Any water-soluble thermoplastic material can be used to prepare the fertilizer stick of this invention. However, it is preferred to use water-soluble thermoplastic hydroxypropyl cellulose. This material is commercially available as Klucel hydroxypropyl cellulose. Thermoplastic hydroxypropyl cellulose and its manufacture are described in U.S. Pat. No. 3,278,521 to E. D. Klug, dated Oct. 11, 1966. The hydroxypropyl cellulose described in the aforementioned patent has an M.S. of 2–10, preferably 3–5, where M.S. is the average number of moles of reactant combined with the cellulose per anhydroglucose unit. In addition, carrying out the disclosed process gives a hydroxypropyl cellulose product which has excellent solubility in water. Other suitable water-soluble thermoplastic substances which can be used to prepare the fertilizer stick of this invention include water-soluble forms of polyvinyl alcohol, polyethylene oxide, methyl cellulose and hydroxypropylmethyl cellulose.

Fertilizer material comprises a solid particulate fertilizer composition containing at least one of the primary plant growth nutrients, nitrogen, phosphorus and potassium. In a preferred embodiment, the fertilizer material is a complete fertilizer composition containing a combination of fertilizer ingredients to provide each of these primary nutrients. However, depending on the nature of the soil or potting medium used any solid particulate fertilizer ingredients can be used, alone or in combination with other fertilizer ingredients.

The source of nitrogen is preferably a slow release fertilizer, such as ureaform. Ureaform, as is well known, is the acid catalyzed polymeric condensate of urea and formaldehyde at a urea to formaldehyde mole ratio in a range from about 1:1 to about 2:1. This normally solid material comprises a water-soluble mostly crystalline low molecular weight fraction and a water-insoluble largely noncrystalline, glassy-like fraction. A preferred ureaform is one made from urea and formaldehyde having a mole ratio in the range from about 1.2:1 to about 1.5:1, most preferably about 1.4:1, and having these specifications:

| | |
|---|---|
| Water Insoluble Nitrogen (WIN) | 24–28% |
| Total Nitrogen | 38–39% |
| Activity Index (AI) | 40% |

["Urea Formaldehyde Fertilizers," Kralociv, R. D., and Morgan, W. A., Agriculture and Food Chemistry, Vol. 2, No. 2, pages 92–94 (1954); Association of Official Agricultural Chemists, "Official Methods of Analysis," 9th Ed. (1960) page 15.]

Other nitrogen fertilizers, such as urea, ammonium nitrate, sodium nitrate, monoammonium phosphate, diammonium phosphate can be used provided the fertilizer can withstand the heat, if any, applied during the formation of the stick.

The source of phosphorus can be any of the known phosphorus fertilizers again with the proviso that the fertilizer be capable of withstanding any heat that might be applied during the stick forming process. Examples of phosphorus fertilizers are monoammonium phosphate, diammonium phosphate, superphosphate (a mixture of calcium acid phosphate and calcium sulfate), and triple superphosphate (calcium acid phosphate).

The source of potassium can be any of the known potassium containing fertilizers. Examples of potassium containing fertilizers are potassium chloride, potassium sulfate, potassium nitrate and potash.

Other fertilizer ingredients, such as those containing sulfur, magnesium, calcium, boron, molybdenum, iron, copper, manganese, zinc, cobalt and other plant growth nutrients can also be included in the fertilizer material. In a preferred embodiment, compounds containing the trace elements, boron, copper, iron, manganese, molybdenum and zinc are incorporated into the particles of ureaform to be used in preparing the fertilizer stick.

Other additives can be included in the thermoplastic composition used to prepare the fertilizer stick. Examples of such additives are pigments and stabilizers. When hydroxypropyl cellulose is used as the water-soluble thermoplastic material, it is preferred to add a stabilizer. Suitable stabilizers for hydroxypropyl cellulose include butylated hydroxytoluene, dilaurylthiodipropionate and the sodium, potassium and calcium salts of benzoic, propionic and sorbic acids.

The water-soluble thermoplastic material containing dispersed fertilizer material is formed into the shape of a stick by known methods of thermoforming plastic compositions. Such methods include extrusion, injection molding and the like. The heat applied during any thermoforming method used to prepare the fertilizer stick should be insufficient to degrade or decompose the fertilizer material. In general, the temperature should be maintained between about 130° C. and about 185° C., preferably between about 155° C. and 165° C. Cold forming methods can also be used. For example, the water-soluble thermoplastic material and fertilizer material can be mixed along with water and the resulting mixture formed into a sheet, which is then dried and cut into sticks. Alternatively the mixture can be extruded directly into the desired shape and dried.

The fertilizer stick of this invention can be used to supply plant growth nutrients to potted plants or to plants growing in the ground, such as in the soil of a garden. The stick can be partially inserted into the potting medium or soil adjacent the roots of the plant as shown in FIG. 3 and then gradually pushed into the soil as the inserted portion dissolves. In an alternate method, the fertilizer stick can be completely inserted into the potting medium or soil, as shown in FIG. 4.

The best mode now comtemplated of carrying out this invention is illustrated by the following example and in the drawings which form a material part of these disclosures. This invention is not limited to the specific embodiment illustrated in this example. All parts and percentages given in the example are by weight.

EXAMPLE 1

The following ingredients are dry blended in a high speed mixer:

| Ingredient | Parts | |
|---|---|---|
| Hydroxypropyl cellulose (molecular weight = 140,000 – 160,000 | 32.84 | |
| 2.6-di-t-butyl-4-methylphenol stabilizer | .07 | |
| Dilaurylthiodipropionate stabilizer | .07 | |
| Phthalocyanine Blue Pigment | .05 | |
| Fertilizer Composition: | | 17.17 |
| Ureaform | 10.99 parts | |
| Triple superphosphate | 2.20 | |
| Potash | 3.98 | |

The resulting mixture is extruded, pelletized and injection molded at 160° C. to form a fertilizer stick.

These and other advantages, features and specific embodiments of this invention will become readily apparent to those exercising ordinary skill in the art after reading the foregoing disclosures. In this connection, while specific embodiments of this invention have been described in considerable detail, variations and modifications of these embodiments can be effected without departing from the spirit and scope of the invention as disclosed and claimed.

The term "consisting essentially" as used in this specification excludes any unrecited substance at a concentration sufficient to substantially adversely affect the essential properties and characteristics of the composition of matter being defined, while permitting the presence of one or more unrecited substances at concentrations insufficient to substantially adversely affect said essential properties and characteristics.

What I claim or I desire to be protected by Letters Patent is:

1. A fertilizer stick consisting essentially of water-soluble hydroxypropyl cellulose having an M.S. of 2–10 and dispersed therein about 10 to about 80% by weight of fertilizer material, based on the weight of the total composition, said stick having substantially the same cross-sectional area throughout its length except for the end portion adapted to be inserted into the soil.

2. A fertilizer stick of claim 1 wherein said fertilizer material is a combination of fertilizer ingredients to provide each of the primary plant growth nutrients, nitrogen phosphorus and potassium.

3. A fertilizer stick of claim 2 wherein said fertilizer material additionally contains the trace elements boron, copper, iron, manganese, molybdenum and zinc.

4. A fertilizer stick of claim 2 wherein said fertilizer material comprises a combination of particulate ureaform, triple superphosphate and potash.

5. A fertilizer stick of claim 4 wherein said particulate ureaform contains the trace elements boron, copper, iron, manganese, molybdenum and zinc.

6. A method of supplying plant growth nutrients to a plant growing in soil which comprises placing into the soil adjacent the roots of the plant the fertilizer stick of claim 1.

7. A method of supplying plant growth nutrients to a potted plant which comprises placing into the potting medium adjacent the roots of the plant the fertilizer stick of claim 1.

8. A fertilizer stick of claim 1 wherein said water-soluble hydroxypropyl cellulose has an M.S. of 3–5.

* * * * *